United States Patent
Wang et al.

(10) Patent No.: US 12,306,872 B2
(45) Date of Patent: *May 20, 2025

(54) METADATA TAG IDENTIFICATION

(71) Applicant: eBay Inc., San Jose, CA (US)

(72) Inventors: Dingxian Wang, New Castle, WA (US); Hongxu Chen, Ryde (AU); Guandong Xu, Ryde (AU); Li He, Beijing (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,949

(22) Filed: Mar. 18, 2024

(65) Prior Publication Data

US 2024/0220537 A1    Jul. 4, 2024

Related U.S. Application Data

(63) Continuation of application No. 17/500,455, filed on Oct. 13, 2021, now Pat. No. 11,966,440.

(51) Int. Cl.
*G06F 16/70* (2019.01)
*G06F 16/74* (2019.01)
(Continued)

(52) U.S. Cl.
CPC ........ *G06F 16/7867* (2019.01); *G06F 16/743* (2019.01); *G06F 16/7834* (2019.01); *G06F 16/7844* (2019.01)

(58) Field of Classification Search
CPC ............. G06F 16/7867; G06F 16/7834; G06F 16/7844
See application file for complete search history.

(56) References Cited

U.S. PATENT DOCUMENTS

| 10,965,999 B2 | 3/2021 | Pappu et al. |
| 11,966,440 B2 | 4/2024 | Wang et al. |

(Continued)

FOREIGN PATENT DOCUMENTS

| CN | 115964520 A | 4/2023 |
| EP | 4167109 A1 | 4/2023 |

OTHER PUBLICATIONS

A. Tjandra et al., Gated Recurrent Neural Tensor Network, 2016 International Joint Conference on Neural Networks (IJCNN), Vancouver, BC, Canada, 2016, pp. 448-455 [retrieved on Oct. 31, 2024]. Retrieved from the Internet: doi: 10.1109/IJCNN.2016.7727233. (Year: 2016).*

(Continued)

*Primary Examiner* — Kristopher Andersen
(74) *Attorney, Agent, or Firm* — FIG. 1 Patents

(57) ABSTRACT

A method for automatic metadata tag identification for videos is described. Content features are extracted from a video into respective data structures. The extracted content features are from at least two different feature modalities. The respective data structures are encoded into a common data structure using an encoder of a recurrent neural network (RNN) model. The common data structure is decoded using a decoder of the RNN model to identify content platform metadata tags to be associated with the video on a social content platform. Decoding is based on group tag data for users of the social content platform that identifies groups of the users and corresponding group metadata tags of interest for the groups of users.

20 Claims, 6 Drawing Sheets

(51) Int. Cl.
  *G06F 16/78* (2019.01)
  *G06F 16/783* (2019.01)
  *G06F 16/40* (2019.01)
  *G06F 16/90* (2019.01)

(56) References Cited

U.S. PATENT DOCUMENTS

2016/0253715 A1  9/2016  Xie et al.
2020/0134398 A1  4/2020  Kruk et al.
2020/0183996 A1  6/2020  Deluca et al.
2021/0103762 A1  4/2021  El-Alfy et al.
2023/0115897 A1  4/2023  Wang et al.

OTHER PUBLICATIONS

U.S. Appl. No. 17/500,455, filed Oct. 25, 2023, "Final Office Action", U.S. Appl. No. 17/500,455, Oct. 25, 2023, 31 pages.
U.S. Appl. No. 17/500,455, filed Apr. 12, 2023, "Non-Final Office Action", U.S. Appl. No. 17/500,455, Apr. 12, 2023, 29 pages.
U.S. Appl. No. 17/500,455, filed Jan. 29, 2024, "Notice of Allowance", U.S. Appl. No. 17/500,455, Jan. 29, 2024, 6 pages.
22200646.2, "Extended European search Report received for European Patent Application No. 22200646.2, mailed on Feb. 20, 2023", Feb. 20, 2023, 11 pages.
Github, "TensorFlow/models", Retrieved from Internet URL: https://github.com/tensorflow/models/tree/master/research/audioset/vggish, Jun. 9, 2021, 4 pages.
Gong, et al., "Hashtag recommendation for multimodal microblog posts", Neurocomputing, vol. 272 XP085275929, ISSN: 0925-2312, DOI: 10.1016/J.NEUCOM.2017.06.056, 2018, pp. 170-177.
Wang, et al., "Microblog Hashtag Generation via Encoding Conversation Contexts", Proceedings of NAACL-HLT, Association for Computational Linguistics, 2019, pp. 1624-1633.
Wei, et al., "Personalized Hashtag Recommendation for Microvideos", Proceedings of the 27th ACM International Conference on Multimedia, Aug. 27, 2019, pp. 1446-1454.
Wu, et al., "Hashtag Recommendation with Attention-Based Neural Image Hashtagging Network", Advances in Databases and Information Systems; [Lecture Notes in Computer Science; Lect.Notes Computer], Springer International Publishing, Cham, Nov. 18, 2018, pp. 52-63.
Yang, et al., "AMNN: Attention-Based Multimodal Neural Network Model for Hashtag Recommendation", IEEE Transactions on Computational Social Systems, vol. 7, No. 3, Retrieved from Internet URL: <https://doi.org/10.1109/TCSS.2020.2986778>, 2020, pp. 768-779.

\* cited by examiner

US 12,306,872 B2

METADATA TAG IDENTIFICATION

RELATED APPLICATION

This application is a continuation of and claims priority to U.S. patent application Ser. No. 17/500,455, filed Oct. 13, 2021, entitled "Metadata Tag Identification," the entire disclosure of which is hereby incorporated by reference herein in its entirety.

BACKGROUND

Metadata tags such as hashtags are often used by social media platforms as a form of tagging content on the platforms in a manner that allows cross-referencing of similar content (e.g., posts or videos having a related subject or theme). Generally, the metadata tag is input by a user, for example, by typing in a hash symbol and their desired text, such as "#coffee" or "#BostonCremeDonut" for a post having an image with donuts and coffee. As a metadata tag is applied to various posts, other users interested in certain content may perform a search using the metadata tag as a more user-friendly approach, as opposed to searching for file names, file types, user names, etc. Metadata tags for content may also be used for brand promotion and social media discussions. In various scenarios, identifying metadata tags for posts is either time consuming when performed manually or imprecise in targeting a desired user group when performed by a software routine.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving efficiency and accuracy of metadata tag processing.

In aspects, a method for automatic metadata tag identification for videos is provided. The method includes extracting content features from a video into respective data structures, the extracted content features being from at least two different feature modalities. The method further includes encoding the respective data structures into a common data structure using an encoder of a recurrent neural network (RNN) model. The method also includes decoding the common data structure using a decoder of the RNN model to identify content platform metadata tags to be associated with the video on a social content platform, wherein decoding is based on group tag data for users of the social content platform that identifies groups of the users and corresponding group metadata tags of interest for the groups of users.

In further aspects, a method for processing metadata tags is provided. The method includes receiving previously used metadata tags of a social content platform, wherein the previously used metadata tags correspond to users of the social content platform. The method further includes training a neural network model for the social content platform using the previously used metadata tags. The method also includes generating group tag data for the users of the social content platform, wherein the group tag data identifies groups of the users and corresponding metadata tags of interest for the groups of the users. The method also includes decoding a common data structure corresponding to a video for upload to the social content platform to identify metadata tags of the previously used metadata tags for the video based on the group tag data.

In still further aspects, a system for automatic identification of content platform metadata tags for a video is provided. The system comprises a feature extractor configured to extract content features from the video into respective data structures. The extracted content features are from at least two different feature modalities. The system also comprises an object encoder configured to encode previously used metadata tags of users of a social content platform to generate group tag data that identifies groups of the users and corresponding group metadata tags of interest for the groups of users. The system also comprises a recurrent neural network (RNN) model having a multi-modal encoder and a tag decoder. The multi-modal encoder is configured to encode the respective data structures into a common data structure. The tag decoder is configured to decode the common data structure to identify content platform metadata tags to be associated with the video on the social content platform, the tag decoder being configured to decode based on the group tag data.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices.

Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of metadata tag processing, including identification of metadata tags (e.g., existing tags or previously used tags) and generation of new metadata tags. Metadata tags, such as hashtags (e.g., "#coffee"), may be used to improve sales of goods by focusing on a targeted consumer who is likely to view content associated with a particular metadata tag. Since hashtags play an important role in online marketing, e-Commerce platforms that place advertisements may seek to identify relevant metadata tags to increase the effectiveness of advertisements provided to consumers. However, popular metadata tags are often changing and may be difficult to identify at a particular given time.

The present disclosure describes a tag processor that may automatically generate metadata tags for a video (or other content) using several feature modalities of the video, such as visual features, audio features, and/or textual features. The tag processor may extract content features from the video and encode the content features into a common data structure. In other words, the common data structure represents visual features, audio features, and/or textual features of the video. The tag processor decodes the common data structure to identify metadata tags to be associated with the video on a social content platform (e.g., TikTok, Facebook, Instagram, etc.). Accordingly, when a user searches for or views posts with particular metadata tags on the social content platform, the video is more likely to appear for that user. The tag processor may encode metadata tags that were previously used on the social content platform to generate the group tag data that identifies groups of users that may be interested in the video. The tag processor may decode the common data structure using the group tag data to more efficiently target groups of users that may be interested in the video.

Figure 1:
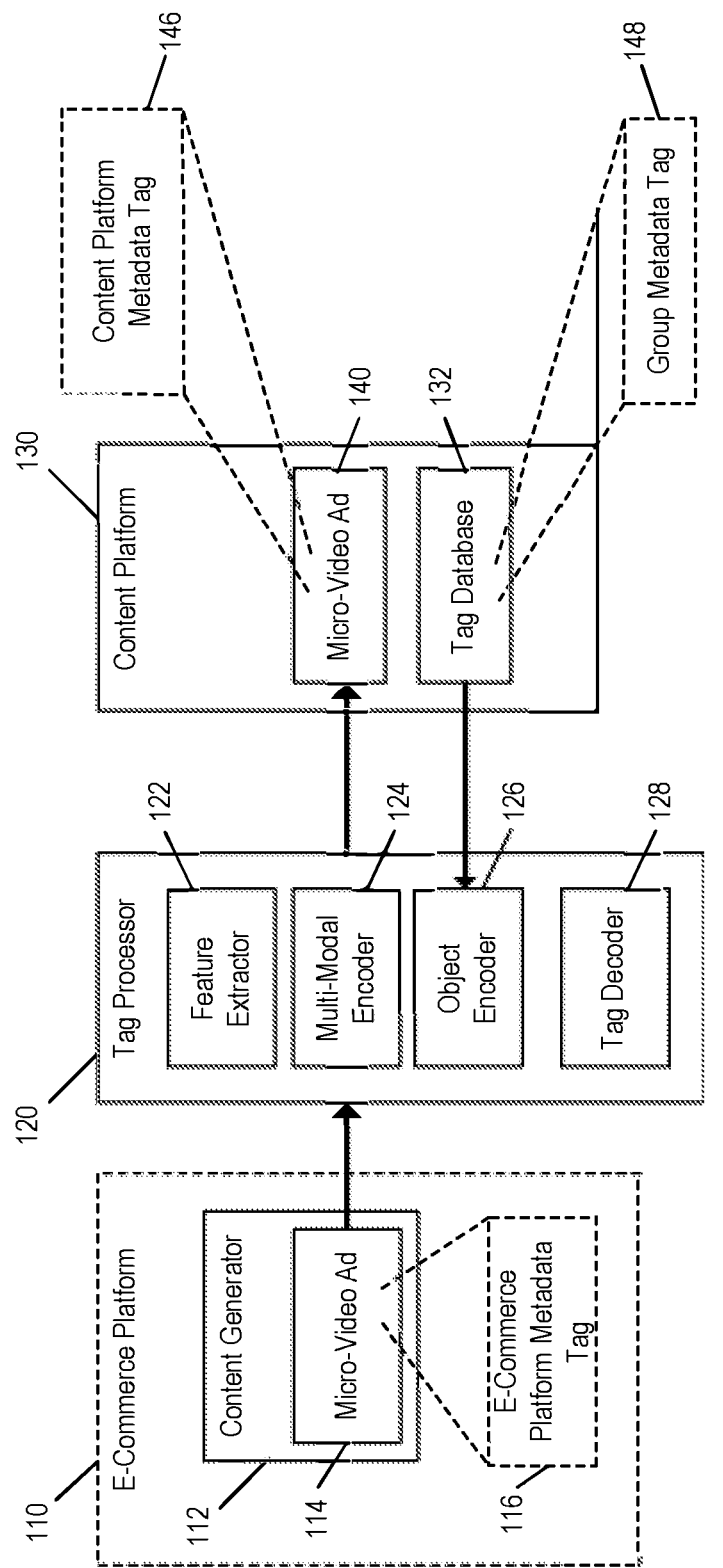
FIG. 1 shows a block diagram of an example of a metadata tag system in which a tag processor may be implemented, according to an example embodiment.

This and many further embodiments for metadata tag processing are described herein. For instance, FIG. 1 shows a block diagram of an example of a metadata tag system 100 in which a tag processor 120 may be implemented, according to an example embodiment. The metadata tag system 100 includes an e-Commerce platform 110, the tag processor 120, and a content platform 130. The e-Commerce platform 110 (referred to herein as "platform 110") may be the eBay platform, Amazon platform, Etsy platform, or other suitable online sales platforms and/or services. The platform 110 may include a content generator 112 that generates content, such as micro-video advertisement 114, to be used for advertisements of goods or services being offered and/or auctioned for sale by the platform 110. The micro-video advertisement 114 (also referred to as "video 114") may be displayed on a post on the platform 110, such as an auction listing, sale listing, or other suitable post. In some embodiments, the content generator 112 is an automated software engine that generates the micro-video advertisement 114 based on information from the post (e.g., text, images, videos). In other embodiments, the content generator 112 is an employee or contractor that generates videos such as the video 114 for the platform 110. Although the examples herein refer to the video 114 as content generated by the content generator 112, in other embodiments, different forms of content are generated instead of the video 114, such as posts, micro-videos, images, tweets (i.e., posts on Twitter), hypertext transfer protocol (HTTP) pages, and/or other suitable content.

Content platform 130 may be a website, hosting service, or other suitable platform for providing content to users. Examples of the content provided by the content platform 130 include micro-videos, videos, images, audio files, posts, tweets, or other suitable content. In some scenarios, the content platform 130 may be the TikTok platform, InstaGram platform, Facebook platform, Imgur platform, or other suitable platform or service. In some embodiments, the content platform 130 utilizes metadata tags, such as hashtags, for searching and organizing content hosted by the content platform 130. The content platform 130 may include a tag database 132 that stores the metadata tags (e.g., group metadata tags 148) associated with content on the content platform 130. The tag database 132 may also include data about the use of the metadata tags, for example, how often a particular metadata tag is used (e.g., uses per minute or per week, total usage), which users have used or viewed posts with the metadata tag, etc., and thus may be utilized to identify "trending" metadata tags that are popular among at least some users. In some embodiments, the tag database 132 contains data that models interactions between users, metadata tags, and content (e.g., micro-videos) on the content platform 130.

In some embodiments, the video 114 includes or is associated with one or more metadata tags, such as hashtags, that may be used for searches related to the video 114. Metadata tags associated with the video 114, but not included within the video 114 itself, may be included in a web page or post that references, links to, and/or contains the video 114, for example. The content generator 112 may identify or generate e-commerce platform metadata tags 116 that are associated with the video 114 on the platform 110. For example, an auction listing for a coffee grinder on the platform 110 may include hashtags such as "#coffee" and "#caffeine" that facilitate searches on the platform 110 for items related to coffee.

In some scenarios, metadata tags that are relevant or helpful to users on the platform 110 searching for the video 114 are less relevant to users on the content platform 130. For example, some users on the content platform 130 may prefer to use "#mocha", "#CupOfJoe", or "#Java" when referring to coffee instead of "#coffee", as used on the platform 110. The tag processor 120 is configured to identify and/or generate metadata tags for the video 114 that are more suitable for the content platform 130 (e.g., "#CupOfJoe") than metadata tags that may be used on the e-commerce platform 110 (e.g., "#coffee), in various embodiments and/or scenarios. In other words, the video 114 may be posted to the content platform 130 as video 140 with content platform metadata tags 146 that are different from the e-commerce platform metadata tags 116 and specific to the content platform 130. By identifying the content platform metadata tags 146 for the video 140 that are popular on the content platform 130 (e.g., used more frequently, used by a higher number of users, more likely to be searched, etc.), the tag processor 120 makes the video 140 more likely to be displayed when those popular hashtags are viewed, resulting in additional views and a higher likelihood of a sale on the e-commerce platform 110 based on the video 140. Generally, the video 140 and the video 114 have same content (e.g., audio, visual, textual content) but different metadata tags. However, in some scenarios, the metadata tags may be embedded within the corresponding videos or combined with the video (e.g., as a scrolling text banner in a video), resulting in different files.

The tag processor 120 may be implemented as a computing device, in various embodiments. For example, the tag processor 120 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). In some embodiments, tag processor 120 is a network server, cloud server, or other suitable distributed computing system. The tag processor 120 may be configured to execute one or more software applications (or "applications") and/or services and/or manage hardware resources (e.g., processors, memory, etc.), which may be utilized by users of the tag processor 120.

The tag processor 120 implements a neural network model for metadata tag identification and/or generation, such as a sequence to sequence ("seq2seq") recurrent neural network (RNN) model, in some embodiments. In other words, the tag processor 120 turns one sequence (e.g., a common data structure, such as a vector) representative of the video 114 into another sequence (e.g., a metadata tag or tags) that may be utilized for posting the video 114 on the content platform 130. In some embodiments, content features of the video 114 may be processed to generate a variable-length sequence as the common data structure, which is then encoded into a fixed-length vector representation and then decoded into a variable length sequence (e.g., metadata tags). In some embodiments, the tag processor 120 is further improved to utilize "attention," where an input to a decoder (i.e., tag decoder 128) is a single vector which stores an entire context (i.e., a common data structure), which allows the decoder to look at an input sequence selectively.

Figure 2:
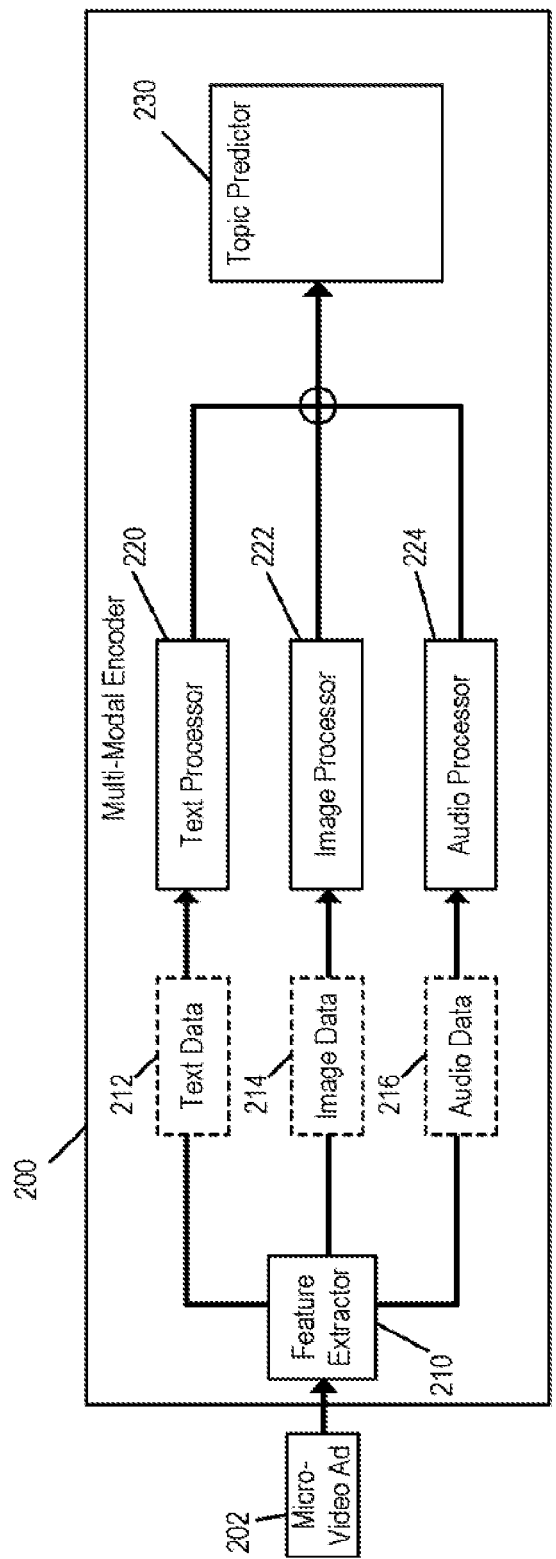
FIG. 2 shows a block diagram of an example multi-modal encoder of the metadata tag system of FIG. 1, according to an example embodiment.

The tag processor 120 includes a multi-modal encoder 124, an object encoder 126, and a tag decoder 128. The multi-modal encoder 124 is configured to generate a common data structure based on content features of videos, such as the video 114, and the common data structure may then be decoded to obtain suitable metadata tags for those videos. Generally, content features from the video 114 are extracted into respective data structures where the extracted content features are from at least two different feature modalities (e.g., visual features of the video 114, audio features of the video 114, and/or textual features of the video 114). In some embodiments, the tag processor 120 includes a feature extractor 122 configured to extract content features from the video 114 for analysis by the multi-modal encoder 124. In other embodiments, the feature extractor 122 is integral with the multi-modal encoder 124, for example, as shown in FIG. 2. In still other embodiments, the content features are not extracted, but are received as metadata from the content generator 112 or other suitable source.

The object encoder 126 is configured to improve awareness of user preferences for metadata tags at an individual level and also at a group level (e.g., groups of users that enjoy coffee or other topics), which improves subsequent learning by the tag processor 120 of similarities between topics of micro-video ads (e.g., video 114) and target user groups (e.g., groups of users that enjoy coffee) of the content platform 130. The object encoder 126 is configured to process entries within the tag database 132 to learn preferences of target users or target groups, for example, by performing group-aware interests modeling, for example, encoding previously used metadata tags of users of the content platform 130 to generate group tag data (e.g., group tag data 330). The group tag data may include a wild language model based on the tag database 132. The tag database 132 may be a public user and hashtag dataset from the content platform, for example. In some scenarios, entries within the tag database 132 have their personal privacy information removed. The object encoder 126 performs self-supervised learning to categorize the groups of users based on particular metadata tags. For example, target users may be divided into several objective groups with different interests, such as sports enthusiast, movie fan, coffee enthusiast, and so on. These interest-based groups are then utilized by the tag decoder 128, as described below.

The tag decoder 128 is configured to decode the common data structure from the multi-modal encoder 124 to obtain suitable metadata tags for the video 140. In some embodiments, the tag decoder 128 is an attention-based sequential language generation module that generates new metadata tags. The tag decoder 128 is further described below.

Although the tag processor 120 is shown as an intermediate processor between the e-commerce platform 110 and the content platform 130, the tag processor 120 may be utilized between other suitable platforms, in other embodiments. In some embodiments, the tag processor 120 is implemented within the e-commerce platform 110, as a standalone processor or as part of the content generator 112, for example.

FIG. 2 shows a block diagram of an example multi-modal encoder 200 of a metadata tag system, according to an example embodiment. Generally, the multi-modal encoder 200 corresponds to the multi-modal encoder 124 of FIG. 1 and the micro-video ad 202 (referred to as "video 202") corresponds to the video 114. The multi-modal encoder 200 encodes extracted content features from content (e.g., video 202) into a common data structure, such as a vector.

The multi-modal encoder 200 comprises a feature extractor 210, a topic predictor 230, and two or more content feature processors from at least two different feature modalities, such as a text processor 220 for a textual modality, an image processor 222 for a visual modality, and an audio processor 224 for an audio modality. Generally, content features within the at least two modalities may be represented as a vector of words or strings, which are readily stored and processed as numerical values. In other words, extracted content features are represented by respective vectors of numerical values, shown herein as vectors of words that form a sentence in vector form. The respective vectors are concatenated into a common data structure (e.g., a long vector) that combines representations of the content features from the different modalities. The topic predictor 230 then clusters the vectors into different groups, where each group represents a different topic (e.g., a coffee group, a coin collecting group, etc.). Although vectors are used as the common data structure in some embodiments, other data structures such as linked lists, matrices, trees, or other suitable data structures may be used in other embodiments.

The feature extractor 210 is configured to extract data from the video 202, such as text data structure 212, image data structure 214, and/or audio data structure 216. Text data structure 212 may comprise text from a description of the video 202, text that appears within the video 202, displayed text or metadata on a web page that hosts the video 202, or other suitable text. The text processor 220 is configured to generate a vector based on the text data structure 212 extracted by the feature extractor 210. In an embodiment, the text processor 220 is implemented using a Sentence2Vector routine that derives the textual features from a description of the video 202. In some embodiments, the text processor 220 utilizes existing metadata tags of the video 202, video category descriptions for the video 202 (e.g., from a website that hosts the video 202), or other suitable category descriptions as inputs to generate the text content data structure.

Image data structure 214 may comprise images from still frames extracted from the video 202, key frames from the video 202, a cover image for the video 202, etc. The image processor 222 is configured to generate a vector based on the image data structure 214 extracted by the feature extractor 210. In an embodiment, the image processor 222 includes a pre-trained ResNet model to obtain a description of visual features from key frames extracted from the video 202, for example, a coffee mug, a coffee grinder, etc.

Audio data structure 216 may include an audio waveform or representation of acoustic features within the video 202. The audio processor 224 is configured to generate a vector based on the audio data structure 216 extracted by the feature extractor 210. In an embodiment, the audio processor 224 implements VGGish software (https://github.com/tensorflow/models/tree/master/research/audioset/vggish) to learn acoustic deep learning features, for example, by receiving an audio waveform as input (e.g., the audio data from the feature extractor 210) and producing embedded representations of semantic content of the audio waveform. In some embodiments, the feature extractor 210 uses FFmpeg 6 software to extract the audio waveform.

The multi-modal encoder 200 concatenates the respective vectors from the text processor 220, the image processor 222, and the audio processor 224 to create the common data structure. As an example, the text processor 220 may provide a first vector with value (coffee, mug, creamer), the image processor 222 may provide a second vector with value (meeting, donut, coffee), and the audio processor 224 may provide a third vector with value (espresso, good morning, donut). In this example, the multi-modal encoder 200 may concatenate the vectors into a single, common data structure as a vector with value (coffee, espresso, mug, creamer, donut, meeting, good morning). In some embodiments, the multi-modal encoder 200 uses a weighting procedure during concatenation, for example, to emphasize values that appear in multiple feature modalities (e.g., "coffee" appearing in both text and audio modalities), emphasize values that appear with higher frequency, and/or emphasize values that are more popular (e.g., "trending").

The topic predictor 230 is configured to automatically process the common data structure and identify a primary topic, or two or more topics, that describe the content of the video 202. The tag decoder 128 may utilize the topics to identify suitable metadata tags for the video 202.

Figure 3:
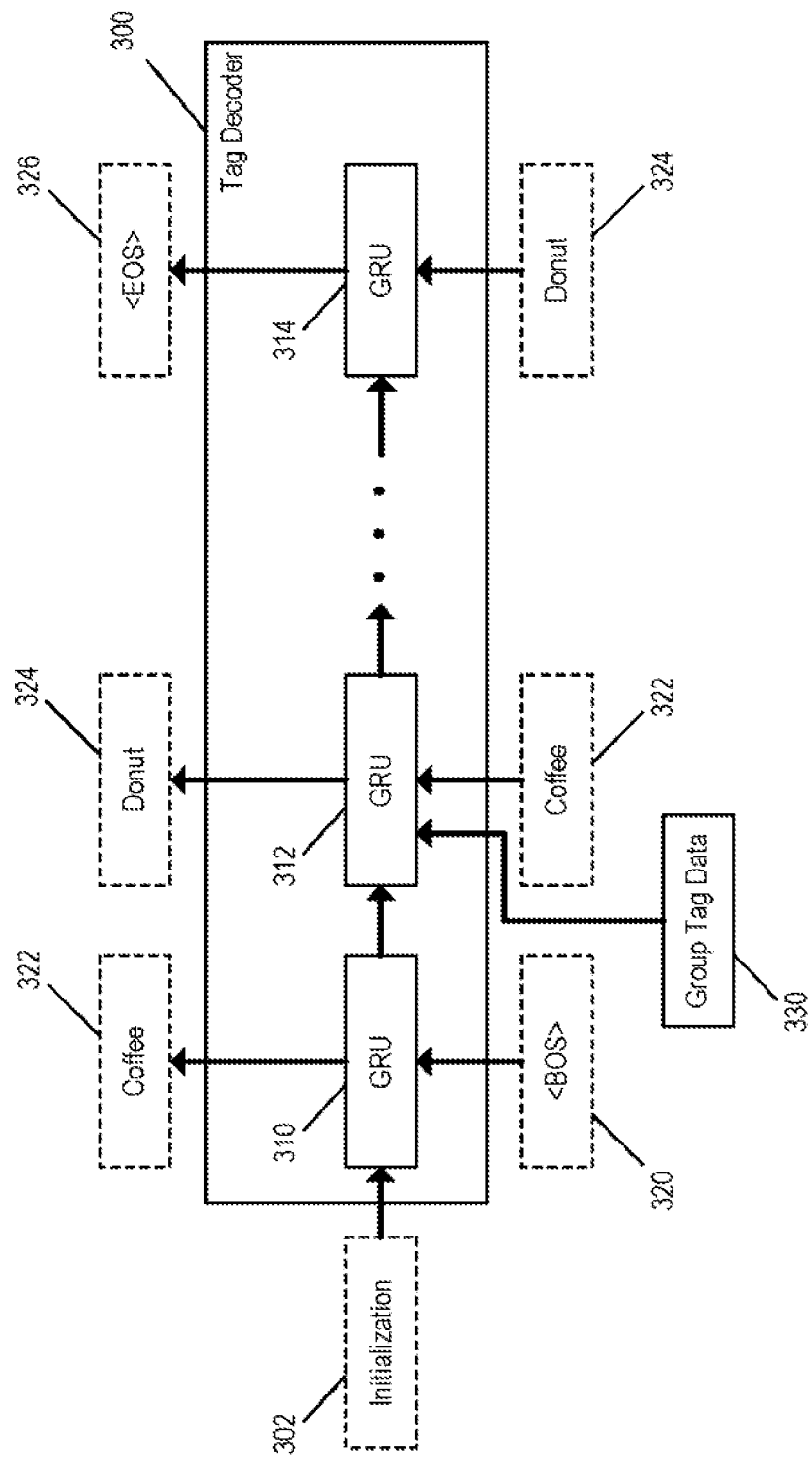
FIG. 3 shows a diagram of an example tag decoder of the metadata tag system of FIG. 1, according to an example embodiment.

FIG. 3 shows a diagram of an example tag decoder 300 of a metadata tag system, according to an example embodiment. Generally, the tag decoder 300 corresponds to the tag decoder 128 of the tag processor 120. In the embodiment shown in FIG. 3, the tag decoder 300 implements a recurrent neural network using a plurality of gated recurrent units (GRUs), such as GRUs 310, 312, and 314. Although only three GRUs are shown, the tag decoder 300 may include additional GRUs, or fewer GRUs, in other embodiments. Additionally, functionality of at least some of the GRUs 310, 312, and 314 may be implemented using a long short-term memory instead of the GRUs 310, 312, and 314, in some embodiments.

The tag decoder 300 is configured to receive the common data structure from a multi-modal encoder (e.g., multi-modal encoder 124 or 200) and align the common data structure to a wild language model provided by the object encoder 126 using group tag data 330. Generally, the GRUs 310, 312, and 314 are arranged sequentially with respective inputs and outputs. For example, the GRU 310 receives an initialization state 302 when beginning to process a common data structure and provides a current state as an input to a subsequent GRU (i.e., to GRU 312). In some embodiments, the initialization state 302 corresponds to a selected group for which metadata tags are to be generated. In the embodiment shown in FIG. 3, the common data structure is a vector such as (coffee, donut, mug, creamer, meeting, good morning) and is processed sequentially from a beginning of the common data structure <BOS> 320, through intermediate elements of the common data structure, Coffee 322 and Donut 324, to an end of the common data structure <EOS> 326.

At least some of the GRUs are configured to receive group tag data 330 as an additional input. Accordingly, the tag decoder 300 utilizes the topic of a video (e.g., video 202) and user interests (e.g., group tag data) and identifies or generates a word sequence for a metadata tag. In different scenarios, the tag decoder 300 may generate different metadata tags for different target groups, for example, based on different values of the initialization state 302. In other words, the tag decoder 300 may generate separate sets of metadata tags for the video 202 for display to different groups of users. For example, a video to be displayed to first and second groups of users may have different first and second groups of metadata tags. In some embodiments, the initialization state 302 is selected based on demographics of a target group, such as age, gender, geographical location, education level, marital status, household income, occupation, hobbies, or other suitable information.

Figure 4:
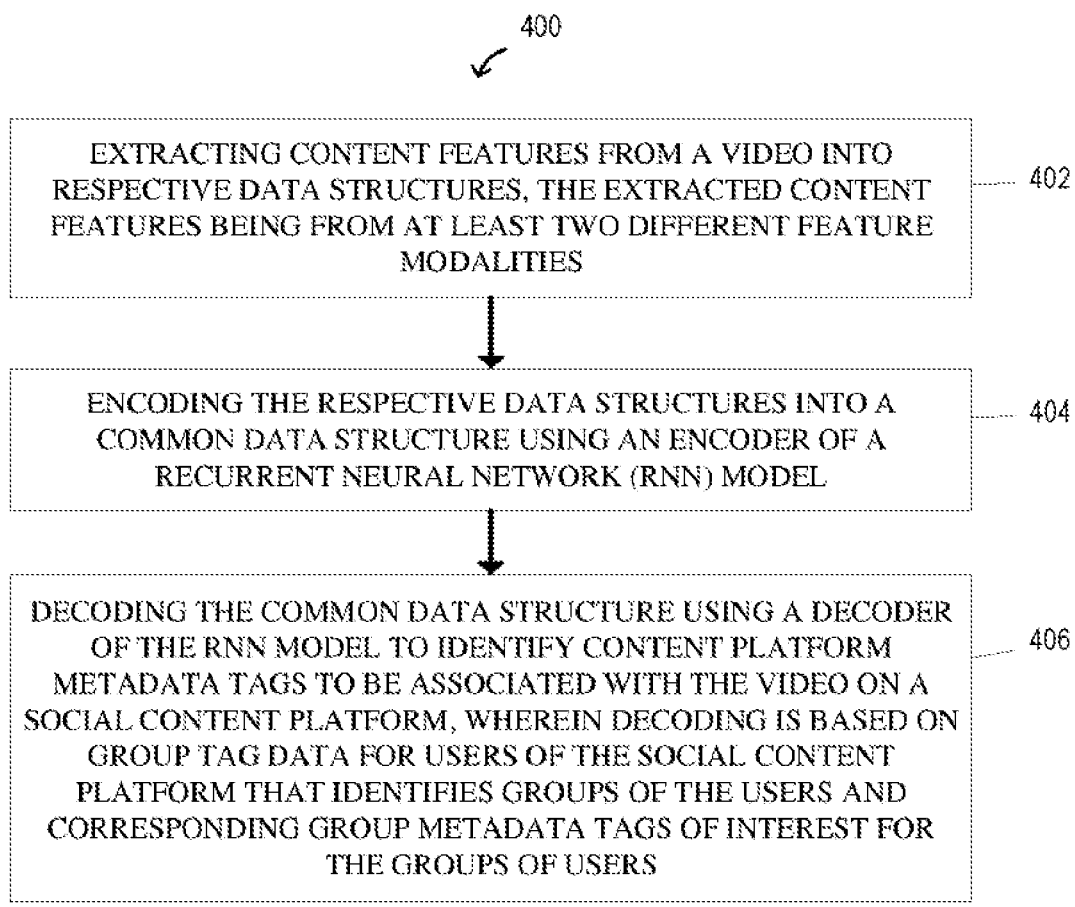
FIG. 4 shows a flowchart of an example method of automatic metadata tag identification for videos, according to an example embodiment.

FIG. 4 shows a flowchart of an example method 400 of automatic metadata tag identification for videos, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the tag processor 120 (e.g., via the feature extractor 122, the multi-modal encoder 124, the object encoder 126, and/or the tag decoder 128), or other suitable computing device.

Method 400 begins with operation 402. At operation 402, content features are extracted from a video into respective data structures, where the extracted content features are from at least two different feature modalities. In an embodiment, the content features are extracted from video 114 or video 202 by the feature extractor 122 or the feature extractor 210 and the respective data structures may include vectors, as described above. The respective data structures may correspond to the text data structure 212, the image data structure 214, and/or the audio data structure 216, in various embodiments. The at least two different feature modalities may include at least two of visual features of the video, audio features of the video, and textual features of the video. In various embodiments, extracting the content features may comprise one or more of: extracting visual features from the video and generating a corresponding visual feature data structure; extracting audio features from the video and generating a corresponding audio feature data structure; and/or extracting textual features associated with the video and generating a corresponding textual feature data structure. In some embodiments, the method 400 may further comprise concatenating the vectors corresponding to the extracted content features into a single vector as the common data structure.

At operation 404, the respective data structures are encoded into a common data structure using an encoder of a recurrent neural network (RNN) model. In an embodiment, the common data structure is a vector of words that form a sentence and represents a topic of the video 114 or video 202. For example, the data structures 212, 214, and 216 are encoded by the topic predictor 230.

At operation 406, the common data structure is decoded using a decoder of the RNN model to identify content platform metadata tags to be associated with the video on a social content platform. Decoding is based on group tag data for users of the social content platform that identifies groups of the users and corresponding group metadata tags of interest for the groups of users. In some embodiments, the tag decoder 300 decodes the common data structure using the group tag data 330 to identify metadata tags for the video 114 or video 202. In another embodiment, the tag decoder 300 generates new metadata tags for the video 114 or video 202. The social content platform corresponds to the content platform 130, the content platform metadata tags correspond to the content platform metadata tags 146, and the second metadata tags correspond to the content platform metadata tags 146, in an embodiment.

The method 400 may further include encoding previously used metadata tags of the users of the social content platform to generate the group tag data. For example, the object encoder 126 may encode previously used metadata tags from the tag database 132 to generate the group tag data 330.

In some embodiments, the method 400 further comprises uploading the video to a social content platform with the content platform metadata tags. For example, the video 202 may be uploaded to the content platform 130. In various embodiments, the video 202 is uploaded with the content platform metadata tags 146 for a plurality of groups of users combined into a single set of metadata tags (e.g., including first metadata tags for a first group, second metadata tags for a second group). In other embodiments, the video 202 is uploaded multiple times, for example, once for each group of users with only the corresponding metadata tags for the group. In still other embodiments, the video 202 is uploaded to two or more different instances of the content platform 130 (e.g., to TikTok and to InstaGram), with each instance of the content platform receiving a copy of the video 202 with content platform metadata tags specific to the corresponding instance of the content platform.

The method 400 may further comprise selecting a first user group of the groups of users, where decoding the common data structure comprises decoding the common data structure to identify first content platform metadata tags for the first user group. The method 400 may further comprise selecting a second user group of the groups of users and decoding the common data structure using the decoder of the RNN model to identify second content platform metadata tags to be associated with the video on the social content platform for display to users of the second user group. At least some of the first content platform metadata tags may be different from the second content platform metadata tags. In other words, the same video may have different metadata tags when targeted to different groups. In some scenarios, the first user group and the second user group share at least some metadata tags of interest but have different demographic characteristics.

Figure 5:
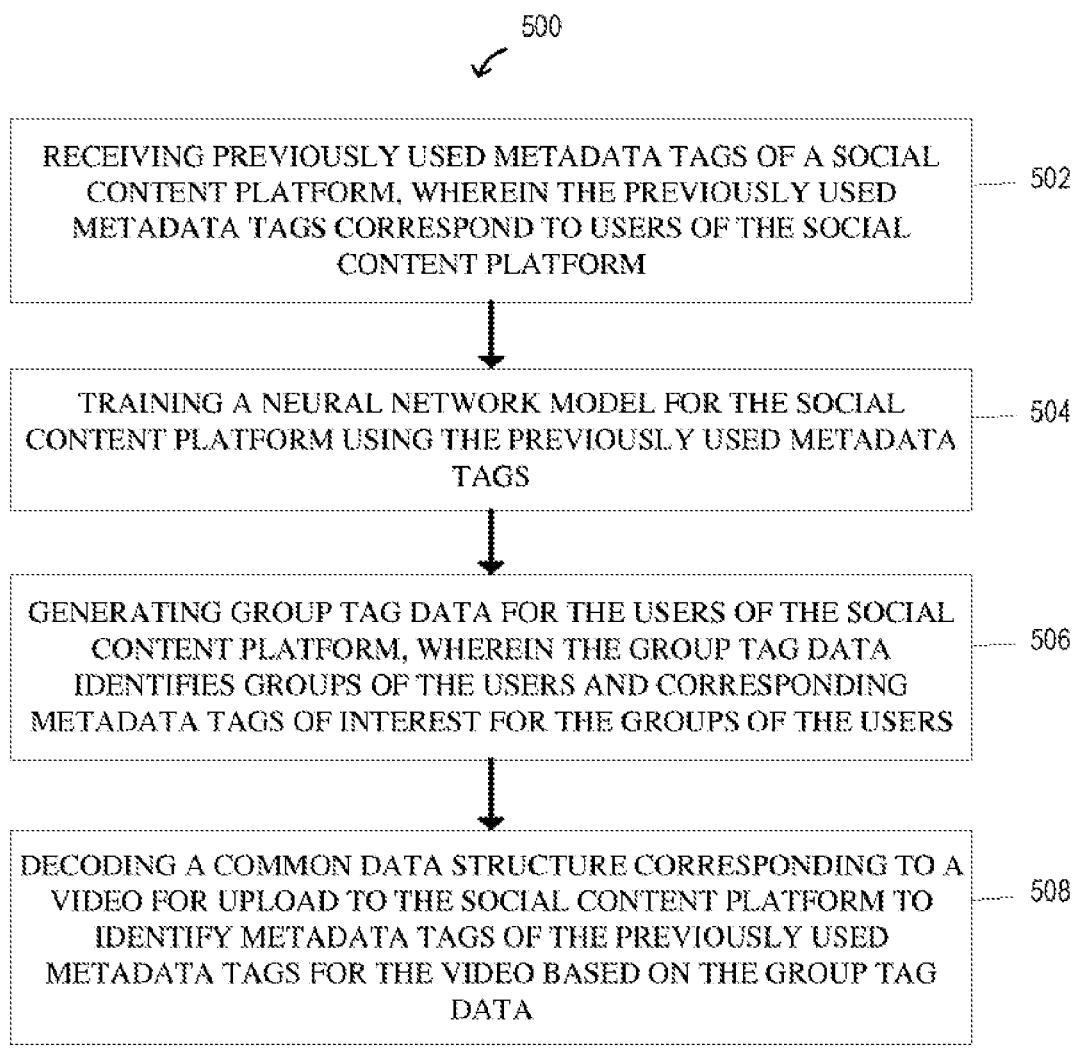
FIG. 5 shows a flowchart of an example method for processing metadata tags, according to an example embodiment.

FIG. 5 shows a flowchart of an example method 500 for processing metadata tags, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the tag processor 120 (e.g., via the feature extractor 122, the multi-modal encoder 124, the object encoder 126, and/or the tag decoder 128), or other suitable computing device.

Method 500 begins with operation 502. At operation 502, previously used metadata tags of a social content platform are received. The previously used metadata tags correspond to users of the social content platform. In some embodiments, the previously received metadata tags are received from the tag database 132.

At operation 504, a neural network model is trained for the social content platform using the previously used metadata tags. The neural network model may correspond to the object encoder 126, for example. Training the neural network model may include performing self-supervised learning using the neural network model to categorize the groups of the users based on the previously used metadata tags and content uploaded by the users to the social content platform. The self-supervised learning may include dividing the users of the social content platform into the groups of the users, where each group of the groups of the users has corresponding metadata tags of interest that are common to users of the group. For example, metadata tags of interest corresponding to a coffee enthusiast group may include coffee, espresso, java, mocha, etc. In some embodiments, the neural network model is trained for cross-platform use with several social content platforms (e.g., for TikTok and InstaGram), but may be trained specifically for a particular social content platform to allow for metadata tags that are specific to the social content platform, in other embodiments.

At operation 506, group tag data is generated for the users of the social content platform. The group tag data identifies groups of the users and corresponding metadata tags of interest for the groups of the users. In some embodiments, the group tag data corresponds to the group tag data 330.

At operation 508, a common data structure, corresponding to a video for upload to the social content platform, is decoded to identify metadata tags of the previously used metadata tags for the video based on the group tag data. For example, the content platform metadata tag 146 is identified by the tag decoder 128 from other metadata tags within the tag database 132. In some embodiments, the tag decoder 128 generates new metadata tags based on the other metadata tags within the tag database 132, for example, by concatenating existing tags.

Figure 6:
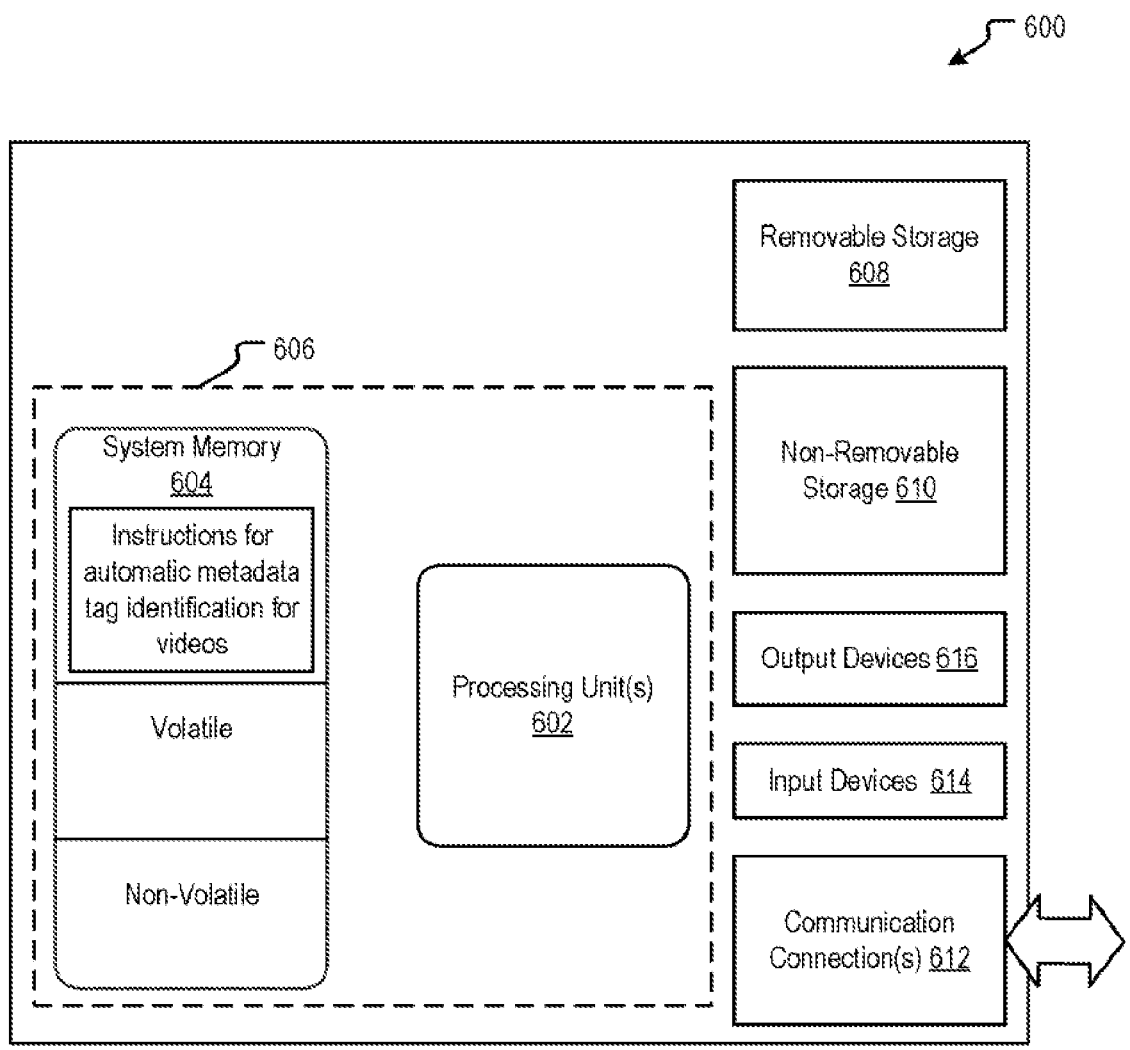
FIG. 6 illustrates a simplified block diagram of the device with which aspects of the present disclosure may be practiced in accordance with aspects of the present disclosure.

FIG. 6 illustrates a simplified block diagram of the device with which aspects of the present disclosure may be practiced in accordance with aspects of the present disclosure. One or more of the present aspects may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions for automatic metadata tag identification for videos described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, touch screens, accelerometers, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   extracting content features from a video, the extracted content features including two or more of textual content features, image content features, and audio content features;
   encoding, by an encoder of a neural network, the extracted content features to represent the extracted content features numerically as a vector;
   decoding, by a decoder of the neural network that includes a plurality of gated recurrent units (GRUs) arranged in a sequence, the vector to identify content platform metadata tags indicative of content from the video by providing, as input to a first GRU in the sequence, an initialization state corresponding to a group of users for which the content platform metadata tags are to be generated; and uploading the video to an online platform with the content platform metadata tags for presentation to the group of users.

2. The method of claim 1, wherein the decoding further includes providing, as input to respective subsequent GRUs in the sequence, content metadata tags as generated by respective previous GRUs in the sequence.

3. The method of claim 1, wherein encoding the extracted content features includes emphasizing, using a weighting procedure, extracted content features that are represented by two or more of the textual content features, the image content features, and the audio content features.

4. The method of claim 1, further comprising providing, as input to one or more GRUs of the plurality of GRUs, group tag data that identifies corresponding group metadata tags for the group of users.

5. The method of claim 1, wherein decoding the vector further includes providing, as input to the first GRU in the sequence, a different initialization state corresponding to an additional group of users to identify additional content platform metadata tags for the additional group of users.

6. The method of claim 5, wherein the content platform metadata tags and the additional content platform metadata tags include at least one different tag.

7. The method of claim 5, further comprising uploading the video to the online platform with the additional content platform metadata tags for presentation to the additional group of users.

8. The method of claim 1, wherein decoding the vector includes:

providing, as input to one or more GRUs of the plurality of GRUs, first group tag data that identifies first corresponding group metadata tags for the group of users, resulting in first content platform metadata tags for the group of users; and providing, as input to one or more GRUs of the plurality of GRUs, second group tag data that identifies second corresponding group metadata tags for an additional group of users, resulting in second content platform metadata tags for the additional group of users.

9. A system, comprising:

at least one processor; and a memory storing instructions which, when executed by the at least one processor, initiate the at least one processor to perform operations including:

extracting content features from a video, the extracted content features including two or more of textual content features, image content features, and audio content features;

encoding, by an encoder of a neural network, the extracted content features to represent the extracted content features numerically as a vector;

decoding, by a decoder of the neural network that includes a plurality of long short-term memory (LSTM) units arranged in a sequence, the vector to identify content platform metadata tags indicative of content from the video by providing, as input to a first LSTM unit in the sequence, an initialization state corresponding to a group of users for which the content platform metadata tags are to be generated; and uploading the video to an online platform with the content platform metadata tags for presentation to the group of users.

10. The system of claim 9, wherein the decoding further includes providing, as input to respective subsequent LSTM units in the sequence, content metadata tags as generated by respective previous LSTM units in the sequence.

11. The system of claim 9, wherein encoding the extracted content features includes emphasizing, using a weighting procedure, extracted content features that are represented by two or more of the textual content features, the image content features, and the audio content features.

12. The system of claim 9, the operations further including providing, as input to one or more LSTM units of the plurality of LSTM units, group tag data that identifies corresponding group metadata tags for the group of users.

13. The system of claim 9, wherein decoding the vector further includes providing, as input to the first LSTM unit in the sequence, a different initialization state corresponding to an additional group of users to identify additional content platform metadata tags for the additional group of users.

14. The system of claim 13, wherein the content platform metadata tags and the additional content platform metadata tags include at least one different tag.

15. The system of claim 13, the operations further including uploading the video to the online platform with the additional content platform metadata tags for presentation to the additional group of users.

16. One or more non-transitory computer readable storage media storing instructions, which when executed by at least one processor, initiate the at least one processor to perform operations comprising:

extracting content features from a video, the extracted content features including two or more of textual content features, image content features, and audio content features;

encoding, by an encoder of a neural network, the extracted content features to represent the extracted content features numerically as a vector;

decoding, by a decoder of the neural network that includes a plurality of gated recurrent units (GRUs) arranged in a sequence, the vector to identify content platform metadata tags indicative of content from the video by providing, as input to a first GRU in the sequence, an initialization state corresponding to a group of users for which the content platform metadata tags are to be generated; and uploading the video to an online platform with the content platform metadata tags for presentation to the group of users.

17. The one or more non-transitory computer readable storage media of claim 16, wherein the plurality of GRUs generate different content platform metadata tags when supplied different values of the initialization state.

18. The one or more non-transitory computer readable storage media of claim 16, wherein the encoding further includes weighting the extracted content features, wherein a larger weight is applied to a first content feature that is extracted from multiple content modalities than a second content feature that is extracted from one content modality.

19. The one or more non-transitory computer readable storage media of claim 16, wherein the initialization state is selected based on demographics of the group of users, the demographics including one or more of age, gender, geographical location, education level, marital status, household income, occupation, or hobbies.

20. The one or more non-transitory computer readable storage media of claim 16, wherein decoding the vector further includes providing, as input to the first GRU in the sequence, a different initialization state corresponding to an additional group of users to identify additional content platform metadata tags for the additional group of users, the content platform metadata tags and the additional content platform metadata tags including at least one different tag.

* * * * *